(12) United States Patent
Hsu (10) Patent No.: US 8,870,508 B2
(45) Date of Patent: Oct. 28, 2014

(54) BOLT-HOLE CAP FOR BOLT HOLE IN LINEAR RAIL

(71) Applicant: Chieftek Precision Co., Ltd, Tainan (TW)

(72) Inventor: Ming-che Hsu, Tainan (TW)

(73) Assignee: Chieftek Precision Co., Ltd., Tainan (TW)

(\*) Notice: Subject to any disclaimer, the term of this patent is extended or adjusted under 35 U.S.C. 154(b) by 0 days.

(21) Appl. No.: 13/941,924

(22) Filed: Jul. 15, 2013

(65) Prior Publication Data

US 2014/0199133 A1 Jul. 17, 2014

(30) Foreign Application Priority Data

Jan. 15, 2013 (TW) .................................. 102101552

(51) Int. Cl.
*F16B 37/14* (2006.01)

(52) U.S. Cl.
CPC ...................................... *F16B 37/14* (2013.01)
USPC ......................... 411/372.5; 411/373; 411/375

(58) Field of Classification Search
USPC ............................. 411/372.5, 372.6, 373, 375
See application file for complete search history.

(56) References Cited

U.S. PATENT DOCUMENTS

| 2,363,665 | A | \* | 11/1944 | George | 411/373 |
| 2,475,446 | A | \* | 7/1949 | Cohen | 135/33.6 |
| 5,017,068 | A | \* | 5/1991 | Cooksey | 411/373 |
| 5,827,029 | A | \* | 10/1998 | Denman | 411/373 |
| 7,883,269 | B2 | | 2/2011 | Iida et al. | |
| 2011/0073557 | A1 | \* | 3/2011 | Lin | 215/355 |

FOREIGN PATENT DOCUMENTS

| DE | 10 2004 001 944 A1 | 8/2005 |
| JP | 2007-321769 A | 12/2007 |
| JP | 2009-127729 A | 6/2009 |

\* cited by examiner

*Primary Examiner* — Roberta Delisle
(74) *Attorney, Agent, or Firm* — Muncy, Geissler, Olds & Lowe, P.C.

(57) ABSTRACT

A bolt-hole cap for sealing the bolt hole of a rail includes a top face and a bottom face from which multiple protrusions extend. Each protrusion extends radially from inner portion toward outer portion of the bolt-hole cap. Each protrusion has two side faces and an end face connected between the two side faces. The end face has a first width. When the bolt-hole cap is inserted into a bolt hole and the top face of the bolt-hole cap is in flush with the top face of the rail, the end face of each of the protrusions contacts the bolt in the bolt hole. The protrusions are plastically deformed toward the side faces and the end face has a second width which is wider than the first width, so that the bolt-hole cap has sufficient strength to keep the top thereof flushing the top of the rail.

10 Claims, 15 Drawing Sheets

BOLT-HOLE CAP FOR BOLT HOLE IN LINEAR RAIL

FIELD OF THE INVENTION

The present invention relates to a bolt-hole cap for a bolt hole in which a bolt is locate, and more particularly, to a bolt-hole cap for a bolt hole in a linear rail so as to prevent foreign objects from entering the bolt hole.

BACKGROUND OF THE INVENTION

Figure 13:
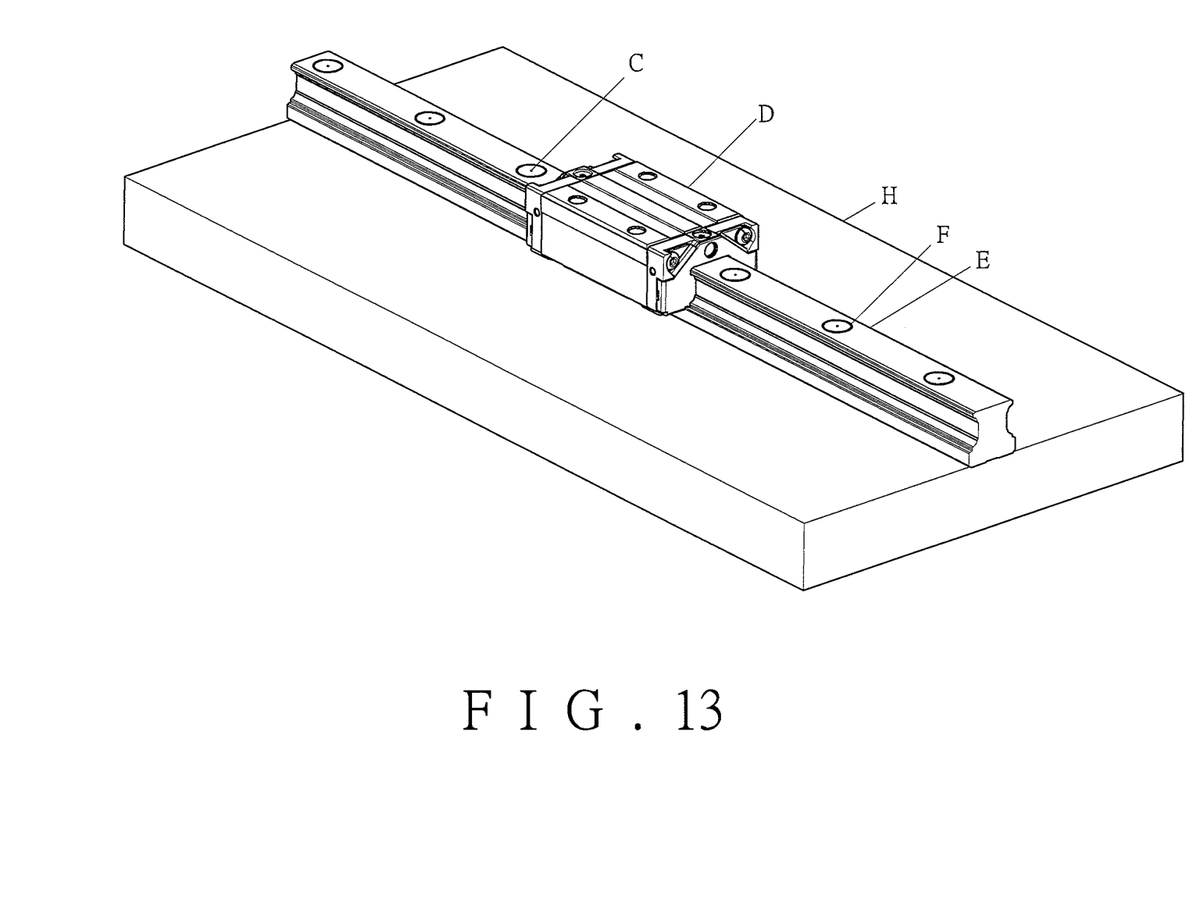
FIG. 13 shows that the rail is fixed to the fixed body and conventional bolt-hole caps seal the bolt holes in the rail.
Figure 14:
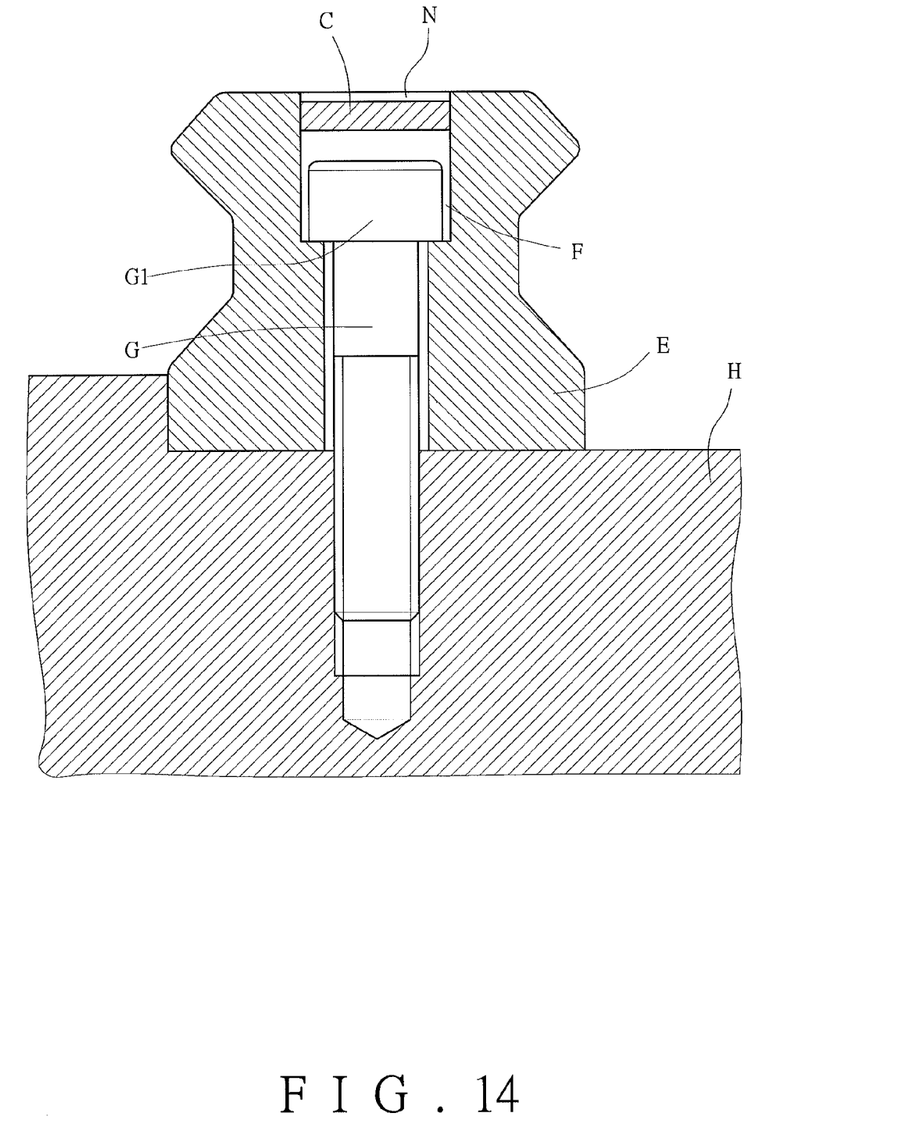
FIG. 14 shows the conventional bolt-hole cap.

The conventional bolt-hole cap for a bolt hole in a rail is disclosed in FIGS. 13 and 14, and generally comprises a slider D movably mounted to a rail E, and the slider D is endlessly moved along the rail E. Multiple bolt holes F are located at the rail E and each has a bolt G extending therethrough so as to fix the rail E to a fixed body H. When the slider D moves along the rail E, the slider D has an end seal connected thereto which is matched on the rail E to prevent foreign objects from entering the slider D to damage the slider D. However, the dust or foreign objects are easily hidden in the bolt holes F of the rail E. When the slider D passes over the bolt holes F, the dust or foreign objects can enter the slider D such that the life of the slider D will be reduced. Therefore, a bolt-hole cap C is used to seal the bolt hole F to prevent the dust or foreign objects from accumulated therein.

The diameter of the bolt-hole cap C is slightly larger than the diameter of the bolt hole F, so that when the bolt-hole cap C is engaged with the bolt hole F, the periphery of the bolt-hole cap C is snugly engaged with the inside of the bolt hole F. Furthermore, when the bolt-hole cap C is engaged with the bolt hole F, a gap/distance is formed between the bolt-hole cap C and the bolt C, and hence the bolt-hole cap C is positioned only by friction. When a force is applied to the bolt-hole cap C and overcomes the friction, the bolt-hole cap C shifts. When the end seal passes over the bolt hole C, the end seal scrubs the rail E and generates a foreign object lump which is pushed downward to the bolt-hole cap C so that the bolt-hole cap C is slightly lowered into the bolt hole F, and an extra space N is formed and more foreign objects are accumulated in the space N.

JP2007-321769 discloses a bolt-hole cap which has multiple rings on the outer periphery thereof and the diameter of the rings are larger than that of the bolt hole, such that friction between the bolt-hole cap and the bolt hole is enhanced. When the bolt-hole cap is hammered into the bolt hole, the bolt-hole cap is securely engaged with the bolt hole. However, during the hammering action, the top surface of the bolt-hole cap may not be in flush with the surface of the rail due to uneven hammering force.

JP2009-127729 discloses a bolt-hole cap which has gradually narrowed protrusion on the inside thereof, the protrusion extends from its base portion to its distal end gradually thinner and eventually forms a cone-shaped end. The protrusion is a ring-shaped part and is located at a distance from a ring-shaped portion. When the bolt-hole cap is inserted into the bolt hole, the distal end of the protrusion contacts the bolt and is deformed radially so that the protrusion contacts the bolt. By the contact between the protrusion and the bolt, the space between the bolt-hole cap and the bolt is filled. However, the distal end of the cone-shaped part cannot provide sufficient force even the cone-shaped part is deformed. When the bolt-hole cap is applied by a large force, the distal end will further be deformed radially to drag the bolt-hole cap into the bolt hole so as to form an extra space.

Figure 15:
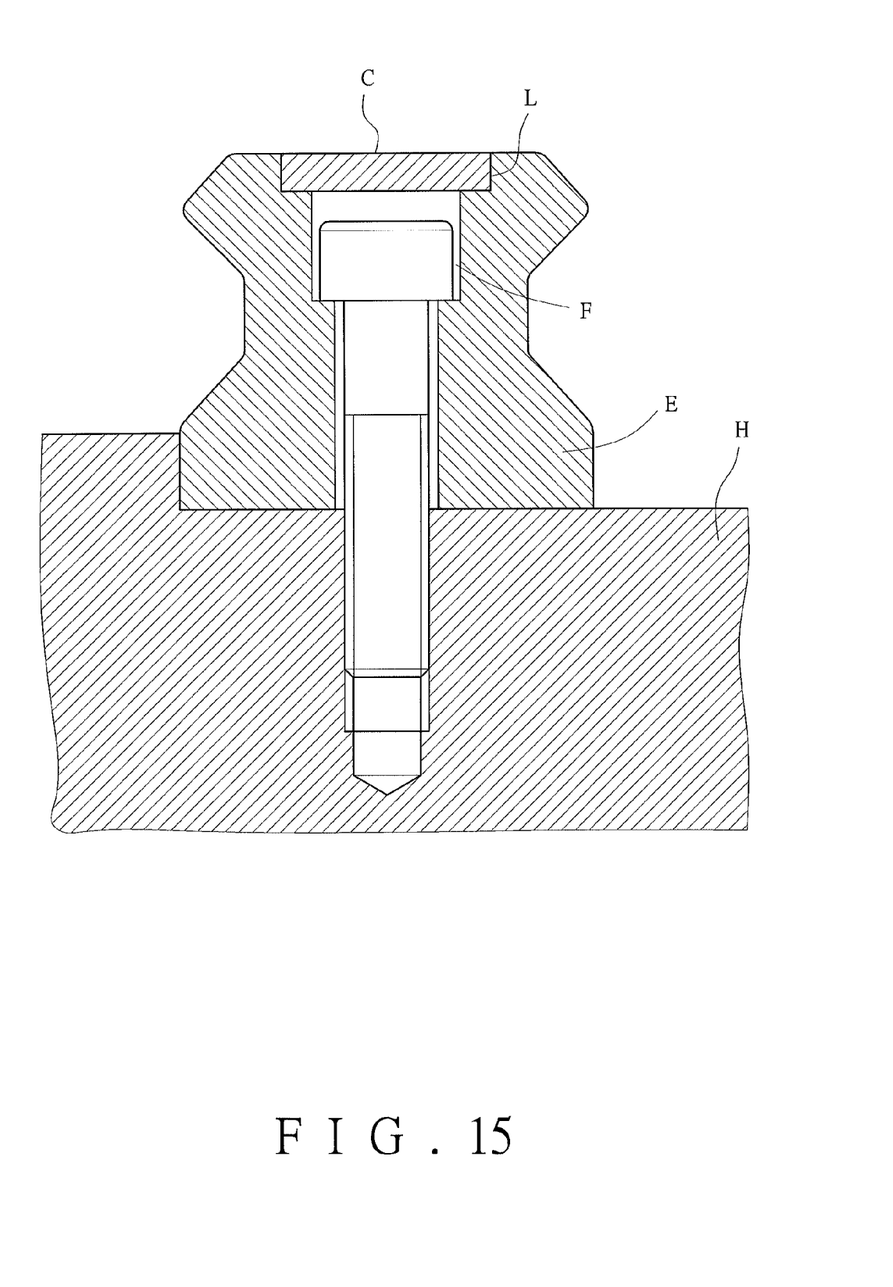
FIG. 15 shows the bolt-hole cap disclosed in DE1020004001944.

DE1020004001944 discloses a bolt-hole cap as shown in FIG. 15, wherein a recess L is formed at the top of the bolt hole F and the bolt-hole cap C is engaged with the recess L. The bolt-hole cap C is supported by the inside of the recess L to keep the top surface of the rail E to be in flush with the top face of the bolt-hole cap C. The bolt-hole cap C can be made by metal to be more durable from friction. In order to keep the top surface of the rail E to be in flush with the top face of the bolt-hole cap C, the tolerance between the recess L and the bolt-hole cap C has to be less than the normal tolerance, such as 0.02 mm. However, the less the tolerance is maintained, the higher manufacturing cost is occurred.

The conventional way to position the bolt-hole cap in the bolt hole is by force-fitting the bolt-hole cap and the friction. It is noted that the friction is not sufficient for position the bolt-hole cap which tends to be lowered into the bolt hole by a downward force. Even the bolt-hole cap with supporting means has similar problem because the supporting means cannot provide sufficient force and the support means is further deformed. Therefore, the bolt-hole cap is moved into the bolt hole. The recess defined in the top of the bolt hole provides good support to the bolt-hole cap, but the cost is high due to higher standard for machining. In order to secure the bolt-hole cap in the bolt hole, prevent foreign objects from entering the rail, and reduce the manufacturing cost, a high strength bolt-hole cap with low manufacturing cost is needed.

SUMMARY OF THE INVENTION

The present invention relates to a bolt-hole cap for sealing the bolt hole of a rail comprises a top face and a bottom face from which at least one protrusion extends. Each protrusion extends radially from inner portion toward outer portion of the bolt-hole cap. Each protrusion has two side faces and an end face connected between the two side faces. The end face has a first width. When the bolt-hole cap is inserted into a bolt hole, a pressing device is used to hit the bolt-hole cap, and a level block is used to keep the bolt-hole cap in horizontal position, so that the top face of the bolt-hole cap is in flush with the top face of the rail. The end face of the at least one protrusion contacts the bolt in the bolt hole and the at least one protrusion is plastically deformed toward the side faces and the end face is deformed to have a second width which is wider than the first width. Even an extra external force is exerted on the bolt-hole cap, the bolt-hole cap does not move into the bolt hole or tilt by the deformed protrusion between the bolt and the bolt-hole cap. Preferably, there are multiple protrusions on the bottom face and the deformation of the protrusions is plastic deformation rather than elastic deformation to prevent that the elastic deformation may shift the bolt-hole cap.

Further, the bolt hole has a shoulder face formed therein, and a first height is defined between the shoulder face and the top surface of the rail. The bolt has a bolt head and the bolt is threaded into the bolt hole. The bolt head is rested on the shoulder face. The bolt head has a second height. The first height is larger than the second height. A third height is defined between the top face of the bolt-hole cap and the end face of the protrusion. The third height is larger than the difference between the first and second heights.

When the bolt-hole cap is pushed downward to be in flush with the top face of the rail and the bolt-hole cap is interferingly contacted with the bolt, the protrusions are plastically deformed laterally. Besides, at least one rounded edge is defined between the end face and one of the side faces of one of the protrusions, so that when the bolt-hole cap is inserted into the bolt hole, the protrusion with the rounded edge has a lateral plastic deformation smoothly generated toward the other one of the side faces of the protrusion, and the lateral plastic deformation is contacted with the bolt.

Further, the bolt-hole cap has an annular outer wall extending from the periphery thereof, wherein the outer wall extends in the direction the same as that of the protrusions. The outer diameter of the outer wall is larger than the inner diameter of the bolt hole. The outer wall is engaged with the inner periphery of the bolt hole when the bolt-hole cap seals the bolt hole. Preferably, an annular recess is defined in the bottom face of the bolt-hole cap and located adjacent to the outer wall. When the outer wall is engaged with the bolt hole, the outer wall presses the inner periphery of the bolt hole to generate a deformation and the annular recess absorbs the deformation to ensure that no lumps or recessed are formed in the top face of the bolt-hole cap.

Furthermore, the bolt-hole cap has an annular inner wall extending from the bottom face thereof, wherein the inner wall extends in the direction the same as that of the protrusions. The protrusions are connected between the inner and outer walls.

Further another, the bolt-hole cap has a contact portion and a metal cover is connected to the contact portion. The bottom face is located on the contact portion and the top face is located on the metal cover. The metal cover makes the bolt-hole cap more durable from friction. Further, the metal cover is supported by the contact portion so that the top face of the metal cover is in flush with the top surface of the rail. Preferably, the metal cover can be made by copper.

Still further another, the contact portion is connected to the metal cover by way of injection molding. Besides, the way of connection between the contact portion and the metal cover comprises a first connecting part connected to the metal cover, and a second connecting part is formed on the contact portion by way of injection molding so as to be connected to the first connecting part. For example, the first connecting part of the metal cover is a metal groove and the second connecting part of the contact portion is an insertion so that when the contact portion is connected to the metal cover, the insertion is inserted into the metal groove so as to securely connect the metal cover and the contact portion.

One aspect of the present invention is that the radial protrusions support the bolt-hole cap to increase the strength of the bolt-hole cap, and the protrusions are laterally and plastically deformed (preferably, not elastic deformation) to contact the bolt. Even if the bolt has uneven tolerances, the bolt-hole cap is in flush with the rail.

Another aspect of the present invention is that the annular recess absorbs the deformation when the bolt-hole cap is engaged with the bolt hole so as to reduce the deformation on the top face of the bolt-hole cap and increase the friction between the bolt-hole cap and the bolt hole, such that the bolt-hole cap is securely engaged with the bolt hole.

Further another aspect of the present invention is that by the lateral plastic deformation of the protrusions contacting with the bolt, the deformed protrusions support between the bolt-hole cap and bolt so that the bolt-hole cap is not sink or tilt to form a gap when being applied a downward force and therefore prevents foreign objects from entering the slider via the gap.

Still further another aspect of the present invention is that the bolt-hole cap is supported by the protrusions so that the recess on the top of the bolt hole as shown in the conventional way is not necessary. The protrusions are made by way of injection molding and replace the recess to reduce the manufacturing cost.

Yet further another aspect of the present invention is that the bolt-hole cap comprises the metal cover which is made by metal and more durable.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
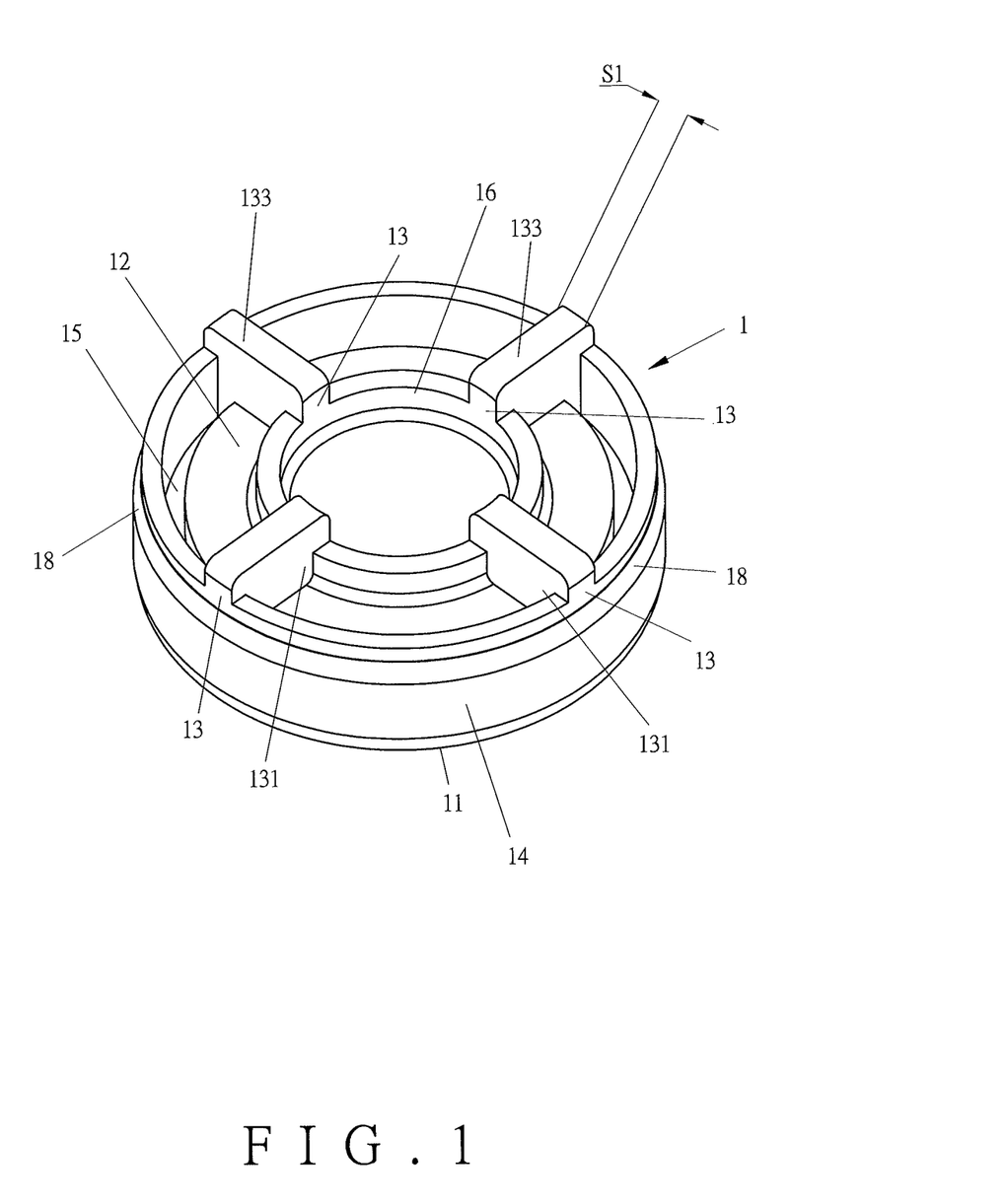
FIG. 1 is a perspective view to show the bolt-hole cap of the present invention.
Figure 2:
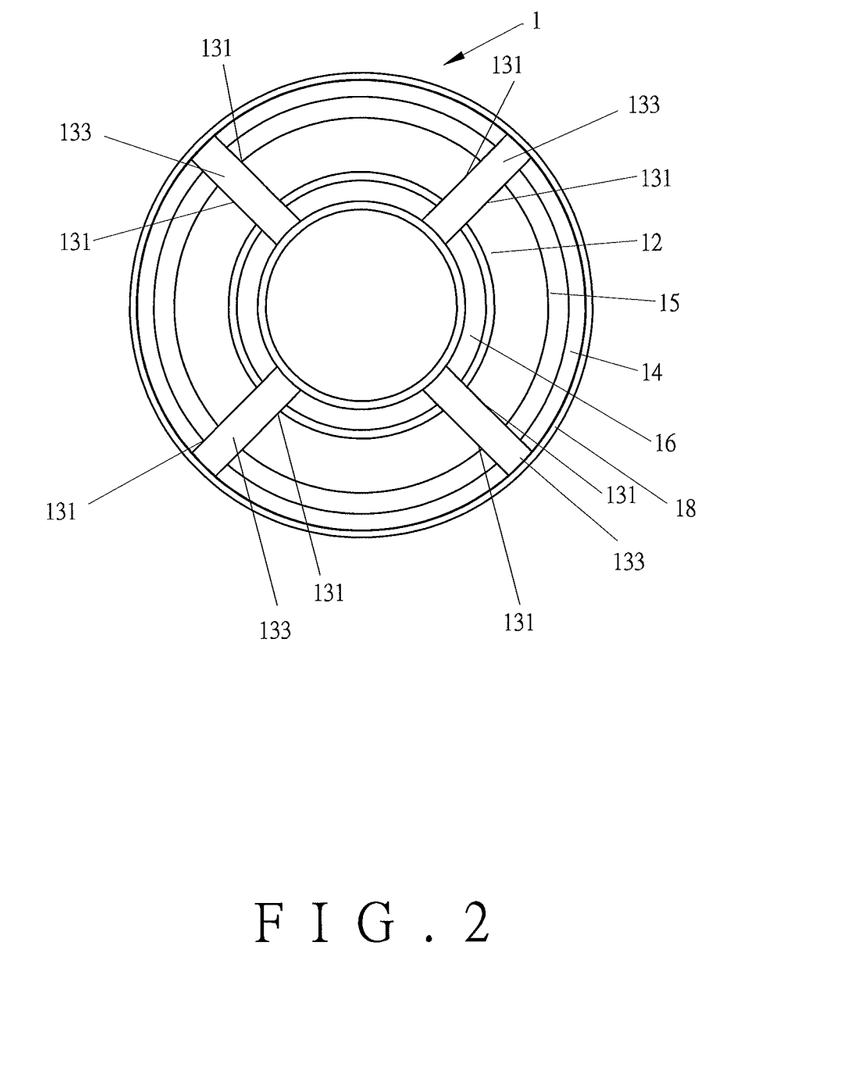
FIG. 2 is a bottom view of the bolt-hole cap of the present invention.
Figure 3:
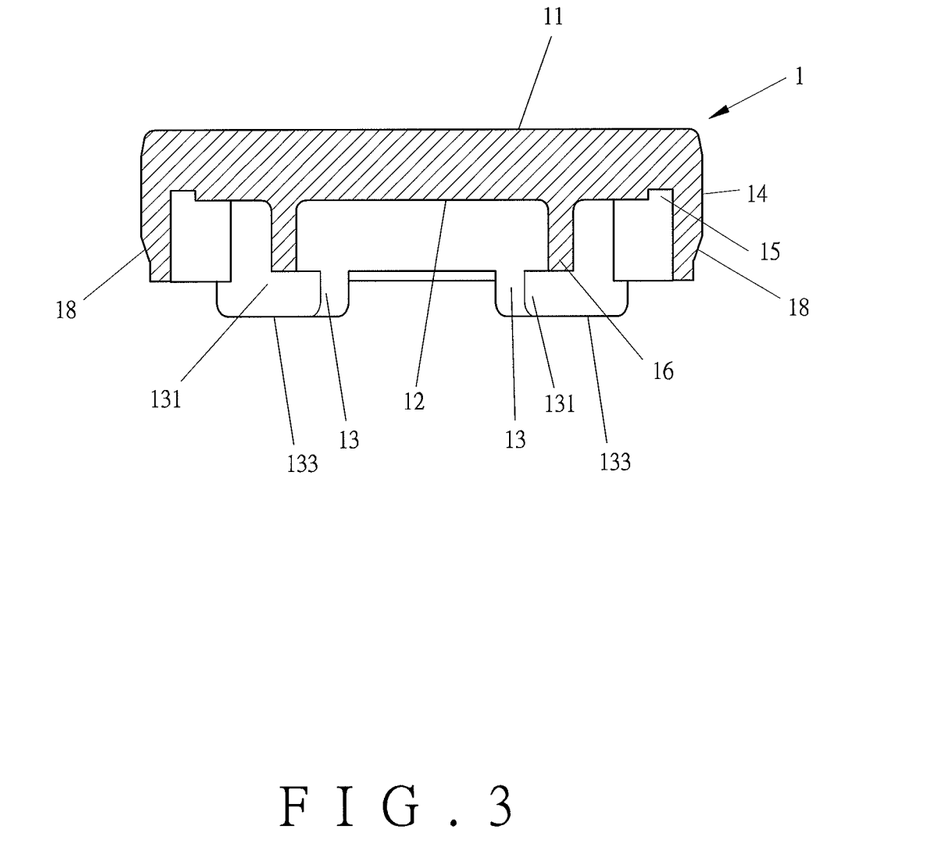
FIG. 3 is a cross sectional view of the bolt-hole cap of the present invention.

Referring to FIGS. 1 to 3, the bolt-hole cap 1 of the present invention comprises a top face 11 which is a flat face, and a bottom face 12, and multiple protrusions 13 extend from the bottom face 12. These protrusions 13 are made by plastic material and have a thickness. The protrusions 13 evenly arranged on the bottom face 12 in a circle manner. Each protrusion 13 extends radially from the inner portion toward the outer portion of the bolt-hole cap 1. Each protrusion 13 has two side faces 131 and an end face 133 which is connected between the two side faces 131. The end face 133 has a first width S1. The bolt-hole cap 1 has an annular outer wall 14 extending from the periphery thereof. A guide face 18 is tapered and annularly arranged on the bottom of the outer wall 14. The outer wall 14 extends in the direction the same as that of the protrusions 13. An annular recess 15 is defined in the bottom face 12 of the bolt-hole cap 1 and located adjacent to the outer wall 14. The bolt-hole cap 1 has an annular inner wall 16 extending from the bottom face 12 thereof. The inner wall 16 extends in the direction the same as that of the protrusions 13. The protrusions 13 are connected between the inner and outer walls 14, 16. In this embodiment, there are four protrusions 13 and the number of the protrusions 13 can be adjusted according to the speed of the slider so as to maintain the solidity of the bolt-hole cap 1.

Referring to FIGS. 4 to 7A and 7B, a pressing device 2 such as a hammer is used to hammer the bolt-hole cap 1 into a bolt hole "A1" of a rail "A". The diameter W3 of the guide face 18 is smaller than the inner diameter W2 of the bolt hole "A1" so that the outer wall 14 is guided by the guide face 18 and is engaged with the inside of the bolt hole "A1". The outer diameter W1 of the outer wall 14 of the bolt-hole cap 1 is slightly larger than the inner diameter W2 of the bolt hole "A1" so that the outer wall 14 is shrink and securely engaged with the inside of the bolt hole "A1" after the bolt-hole cap 1 is inserted into the bolt hole "A1". The annular recess 15 absorbs the deformation during the hammering process so as to allow the outer wall 14 to be shrunk/deformed and to be securely engaged with the inside of the bolt hole "A1". During the hammering process, a leveling block 3 is located between the pressing device 2 and the bolt-hole cap 1 to ensure that the bolt-hole cap 1 is evenly hammered and inserted into the bolt hole "A1".

When the bolt-hole cap 1 is inserted into the bolt hole "A1" and the end face 133 of each of the protrusions 13 contacts the bolt "B" in the bolt hole "A1", the protrusions 13 are plastically deformed toward the side faces 131 to generate lateral plastic deformation "P". The lateral plastic deformation "P" makes the end face 133 have a second width S2 which is wider than the first width S1. By the wider width S2, the protrusions 13 have more support force and strength to be supported between the bottom face 12 of the bolt-hole cap 1 and the bolt "B". By the lateral plastic deformation "P", the stresses in all direction are evenly supported so as to reinforce the strength of the bolt-hole cap 1, and the top face 11 of the bolt-hole cap 1 is in flush with the top face of the rail "A".

Figure 4:
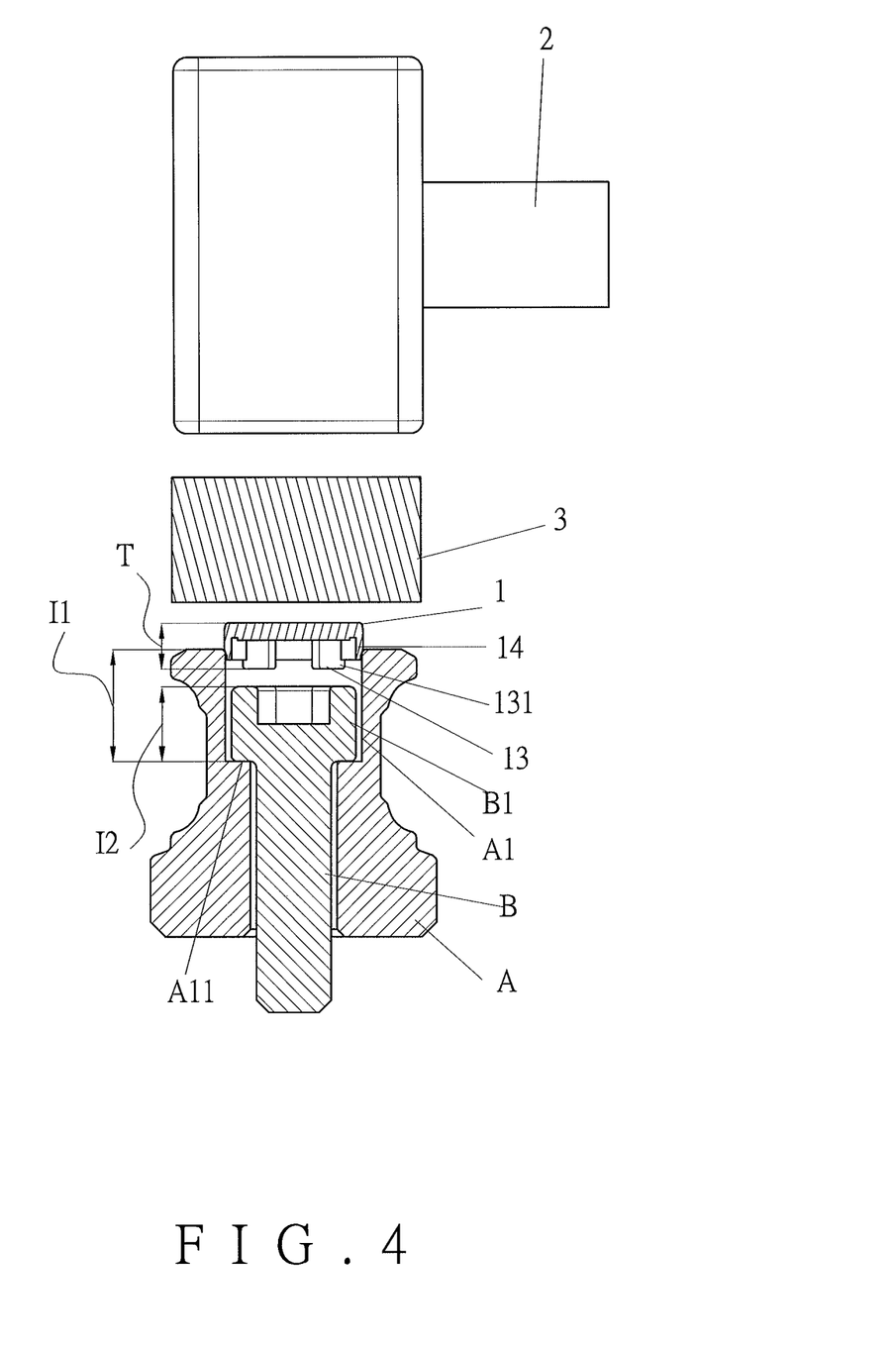
FIG. 4 shows that the bolt-hole cap of the present invention is to be inserted into the bolt hole.
Figure 5:
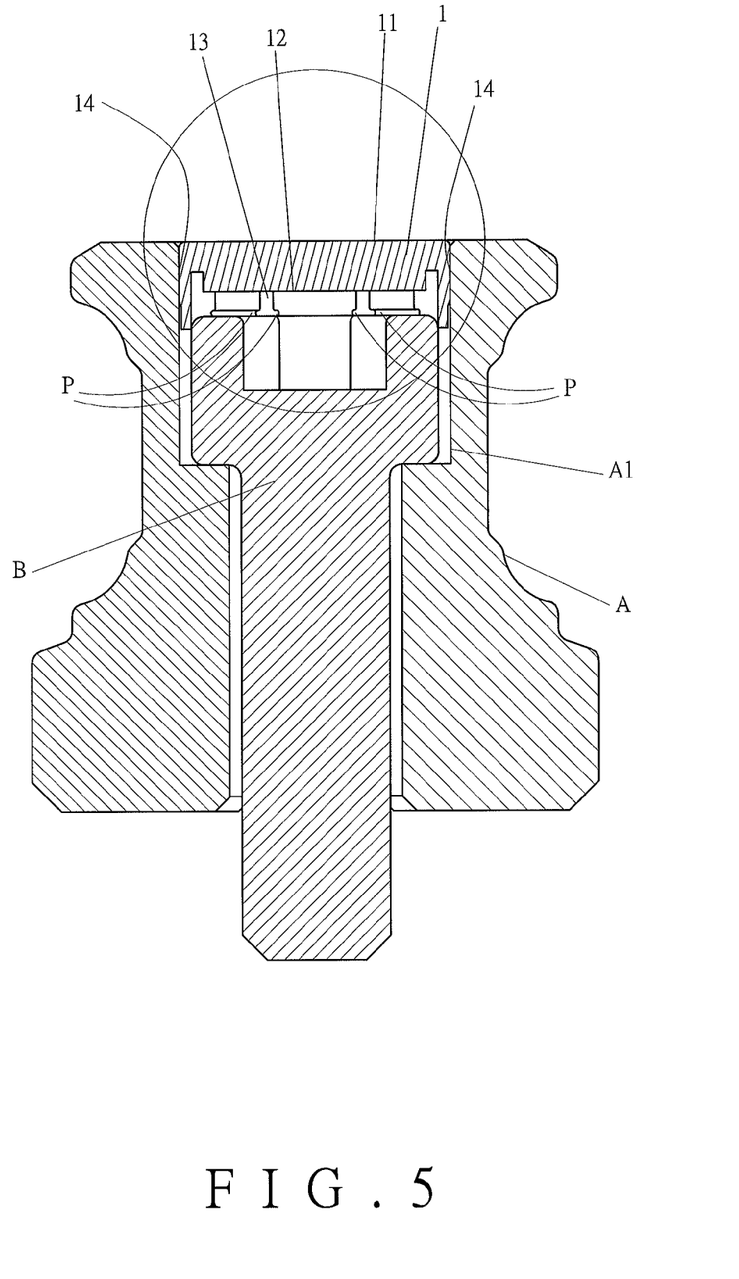
FIG. 5 is a cross sectional view to show that the bolt-hole cap of the present invention is inserted into the bolt hole and contacts the bolt.
Figure 6:
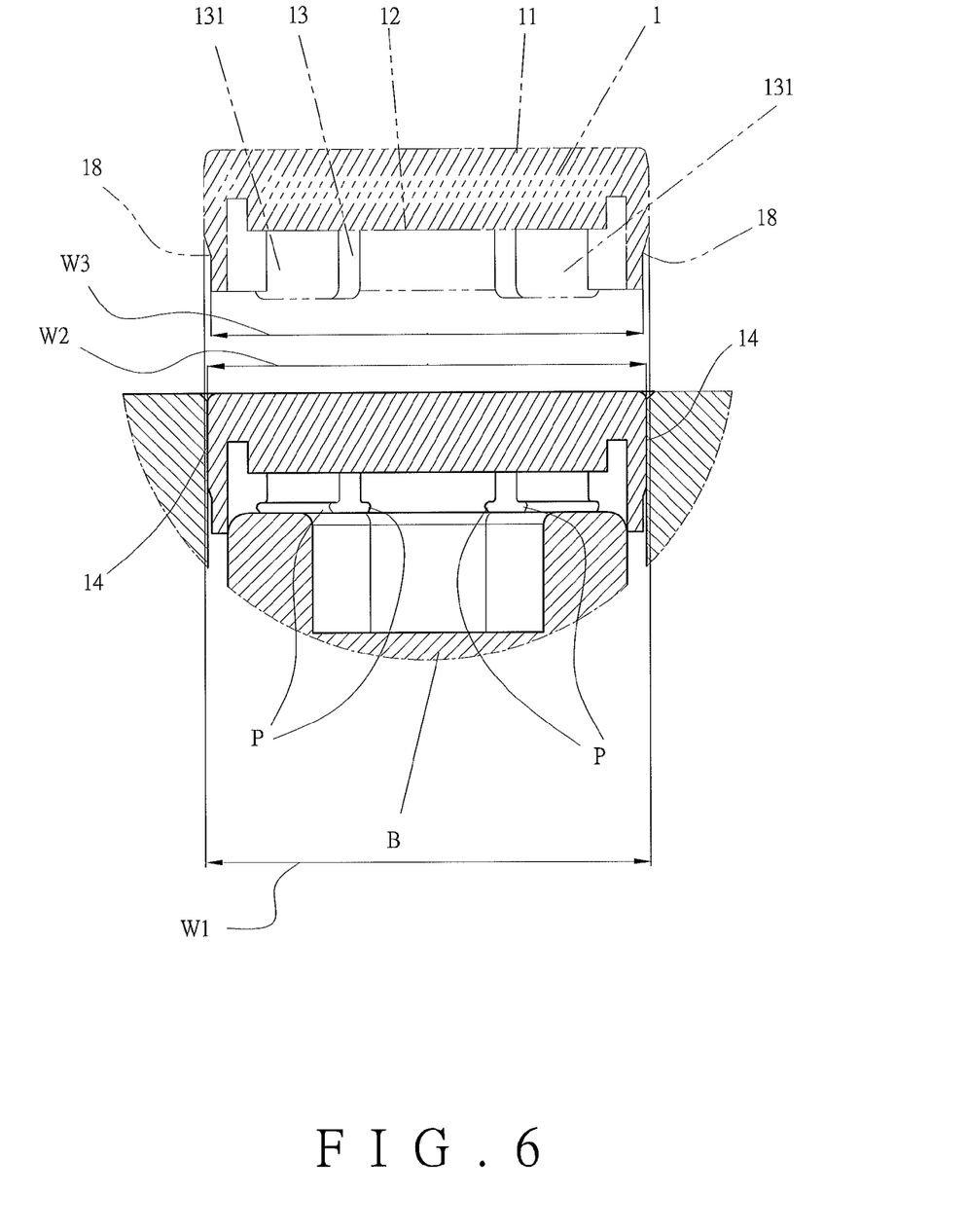
FIG. 6 is an enlarged cross sectional view to show the differences between the bolt-hole cap that is not yet inserted into the bolt hole and the bolt-hole cap that is inserted into the bolt hole.
Figure 7A:
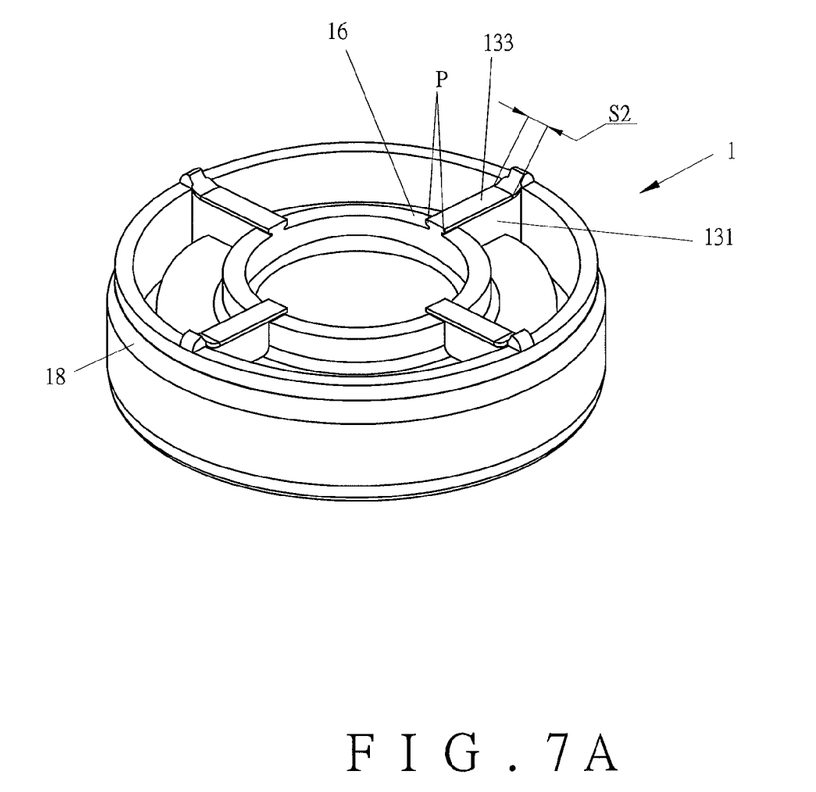
FIG. 7A shows that the protrusions of the bolt-hole cap are deformed.
Figure 7B:
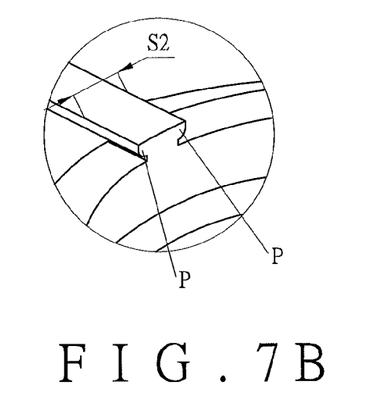
FIG. 7B is an enlarged view of the deformed protrusion in FIG. 7A.

As shown in FIG. 4, the bolt hole "A1" has a shoulder face "A11" formed therein, and a first height I1 is defined between the shoulder face "A11" and the top surface of the rail "A". The bolt "B" has a bolt head "B1" and the bolt "B" is threaded into the bolt hole "A1" so that the bolt head "B1" is rested on the shoulder face "A11". The bolt head "B1" has a second height I2. The first height I1 is larger than the second height I2. A third height T is defined between the top face 11 of the bolt-hole cap 1 and the end face 133 of the protrusion 13. The third height T is larger than the difference between the first and second heights I1, I2. By this specific arrangement, when the bolt-hole cap 1 is inserted into the bolt hole "A1", the protrusions 13 are in contact with the bolt "B" to generate the lateral deformation "P" contacted with the bolt "B".

Figure 8:
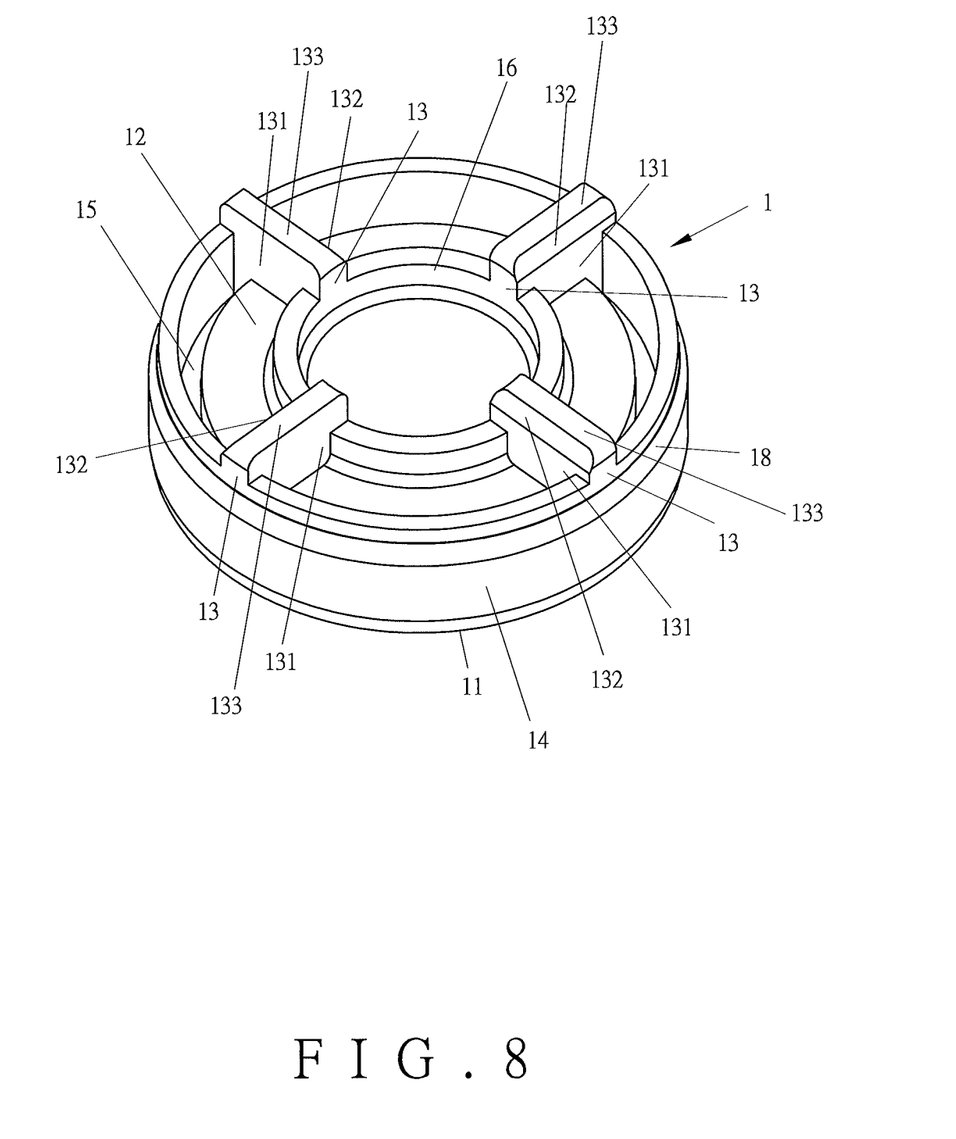
FIG. 8 is a perspective view to show the second embodiment of the bolt-hole cap of the present invention.
Figure 9:
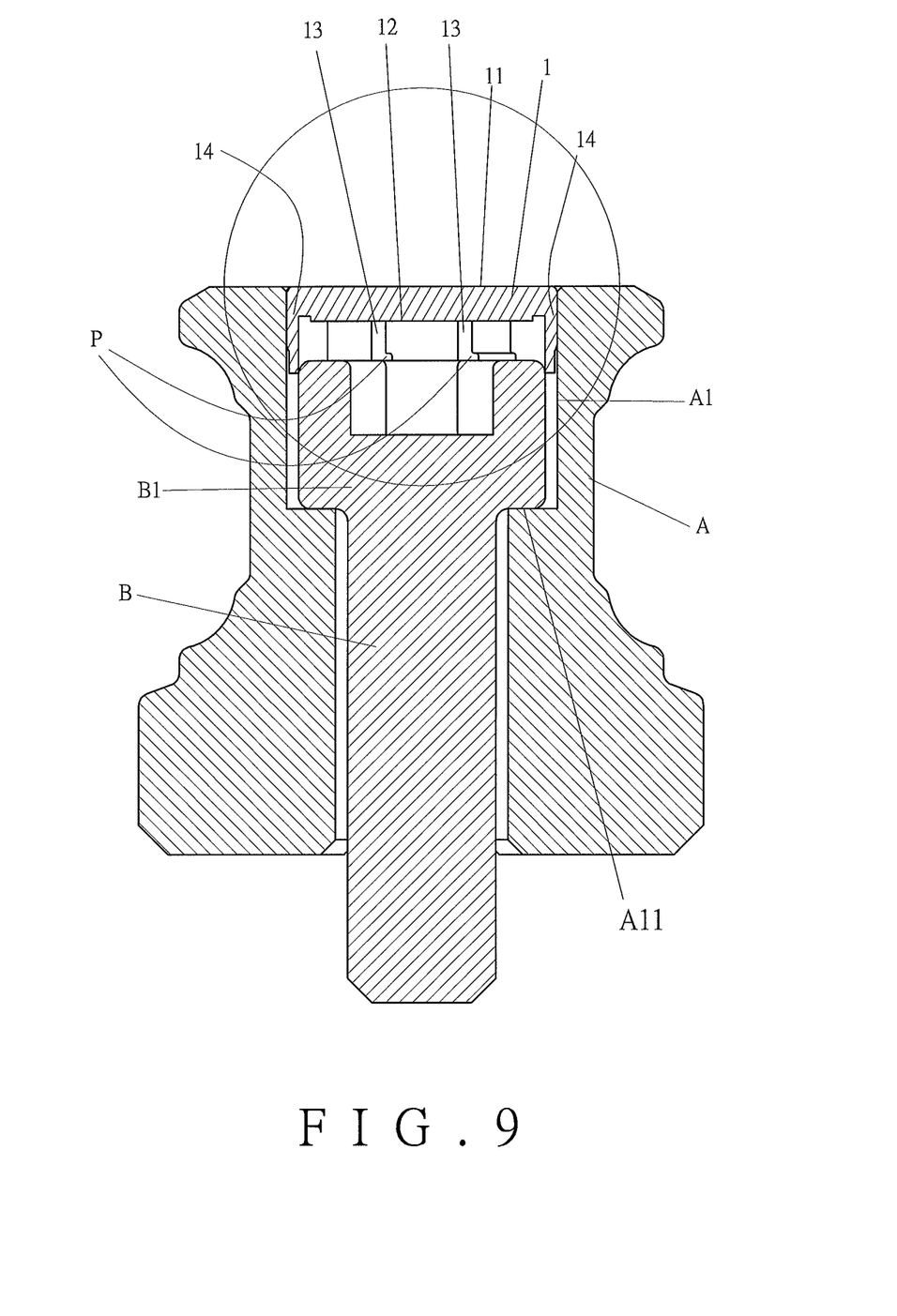
FIG. 9 is a cross sectional view to show that the second embodiment of the bolt-hole cap of the present invention is inserted into the bolt hole and contacts the bolt.
Figure 10:
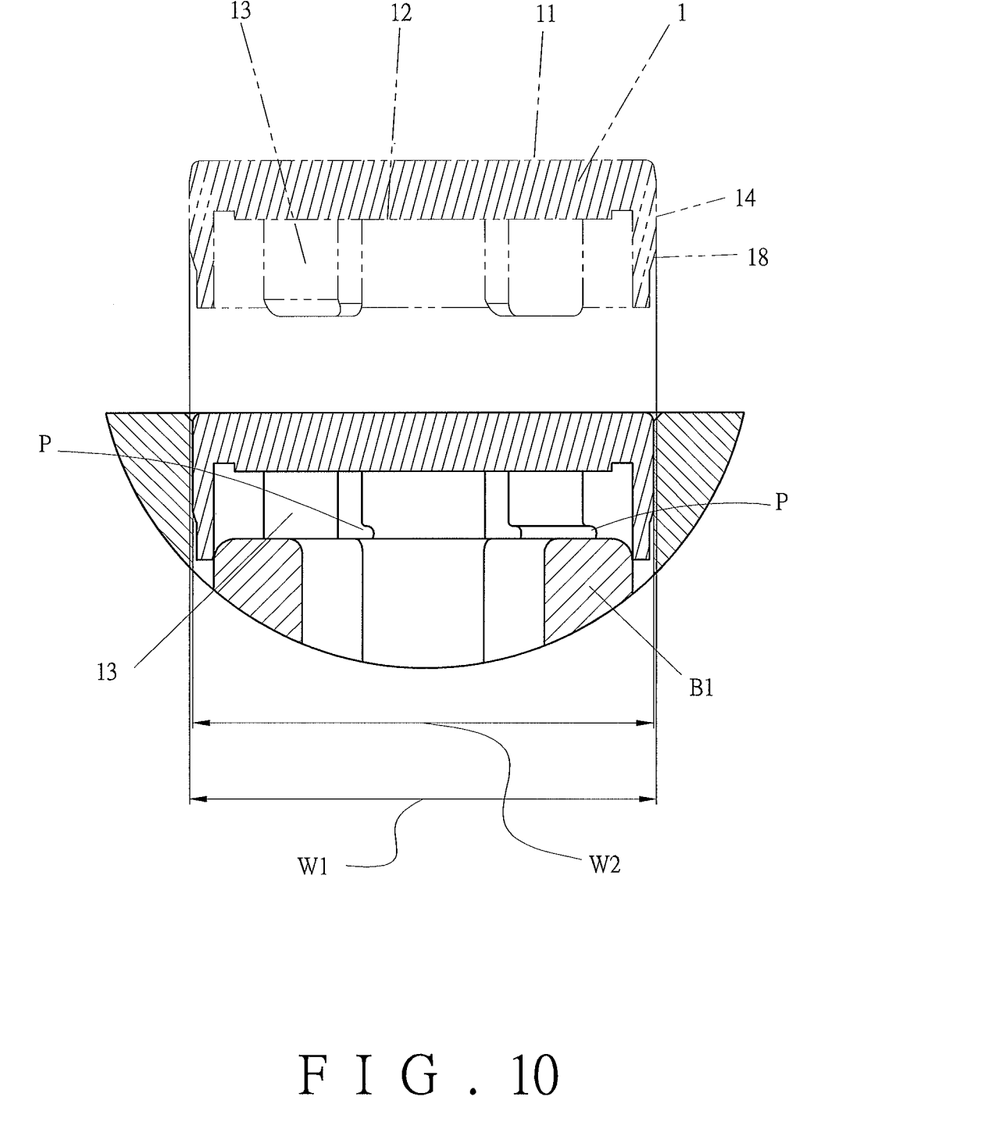
FIG. 10 is an enlarged cross sectional view to show the differences between the second embodiment of the bolt-hole cap that is not yet inserted into the bolt hole and the second embodiment of the bolt-hole cap that is inserted into the bolt hole.

FIGS. 8 to 10 disclose the second embodiment, wherein the difference of the second embodiment from the first embodiment is that a rounded edge 132 is defined between the end face 133 and one of the side faces 133 of each protrusion 13, so that when the bolt-hole cap 1 is inserted into the bolt hole "A1", preferably when the top face 11 of the bolt-hole cap 1 is in flush with the top face of the rail "A", each protrusion 13 has a lateral plastic deformation "P" smoothly generated toward the other one of the side faces 133, and the lateral plastic deformation "P" is contacted with the bolt "B". The protrusions 13 are then supported between the bottom face 12 of the bolt-hole cap 1 and the bolt "B".

Figure 11:
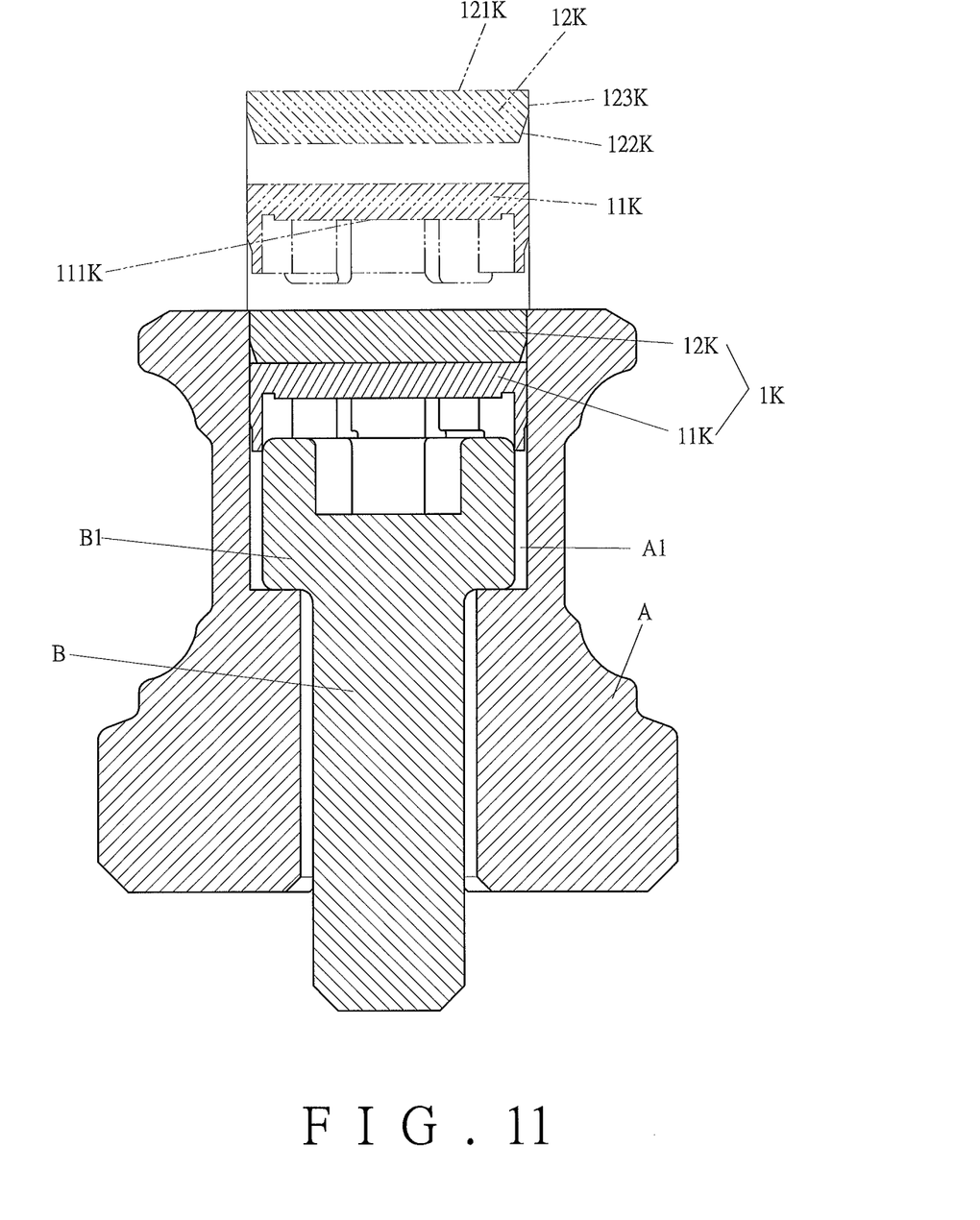
FIG. 11 shows the third embodiment of the bolt-hole cap of the present invention, wherein the bolt-hole cap has a contact portion and a metal cover, and shows the differences between the third embodiment of the bolt-hole cap that is not yet inserted into the bolt hole and the third embodiment of the bolt-hole cap that is inserted into the bolt hole.

FIG. 11 shows the third embodiment, wherein the difference of the third embodiment from the second embodiment is that the bolt-hole cap 1K has a contact portion 11K and a metal cover 12K is connected to the contact portion 11K. The contact portion 11K has a bottom face 111K and the metal cover 12K has a top face 121K. The bottom face 111K has multiple protrusions as the first or second embodiments. The contact portion 11K is first hammered into the bolt hole "A1", and the metal cover 12K is then hammered to top of the contact portion 11K to connect the metal cover 12K and the contact portion 11K. Therefore, the bolt-hole cap 1K is more durable and the life can be prolonged. The metal cover 12K is supported by the contact portion 11K, and the top face 121K of the metal cover 12K is in flush with the top surface of the rail "A". The metal cover 12K has an annular and narrowed metal guide face 122K and a metal interfering face 123K. The diameter of the metal guide face 122K is smaller than the diameter of the bolt hole "A1", so that the metal cover 12K can be guided by the metal guide face 122K and is inserted into the bolt hole "A1". The diameter of the metal interfering face 123K is larger than the diameter of the bolt hole "A1", so that when the metal cover 12K is inserted into the bolt hole "A1", the metal cover 12K can be securely engaged with the bolt hole "A1" by the compressing force that the metal interfering face 123K apples to the inside of the bolt hole "A1", and the friction between the metal cover 12K and the inside of the bolt hole "A1" is increased. Preferably, the metal cover 12K is made by copper.

Figure 12:
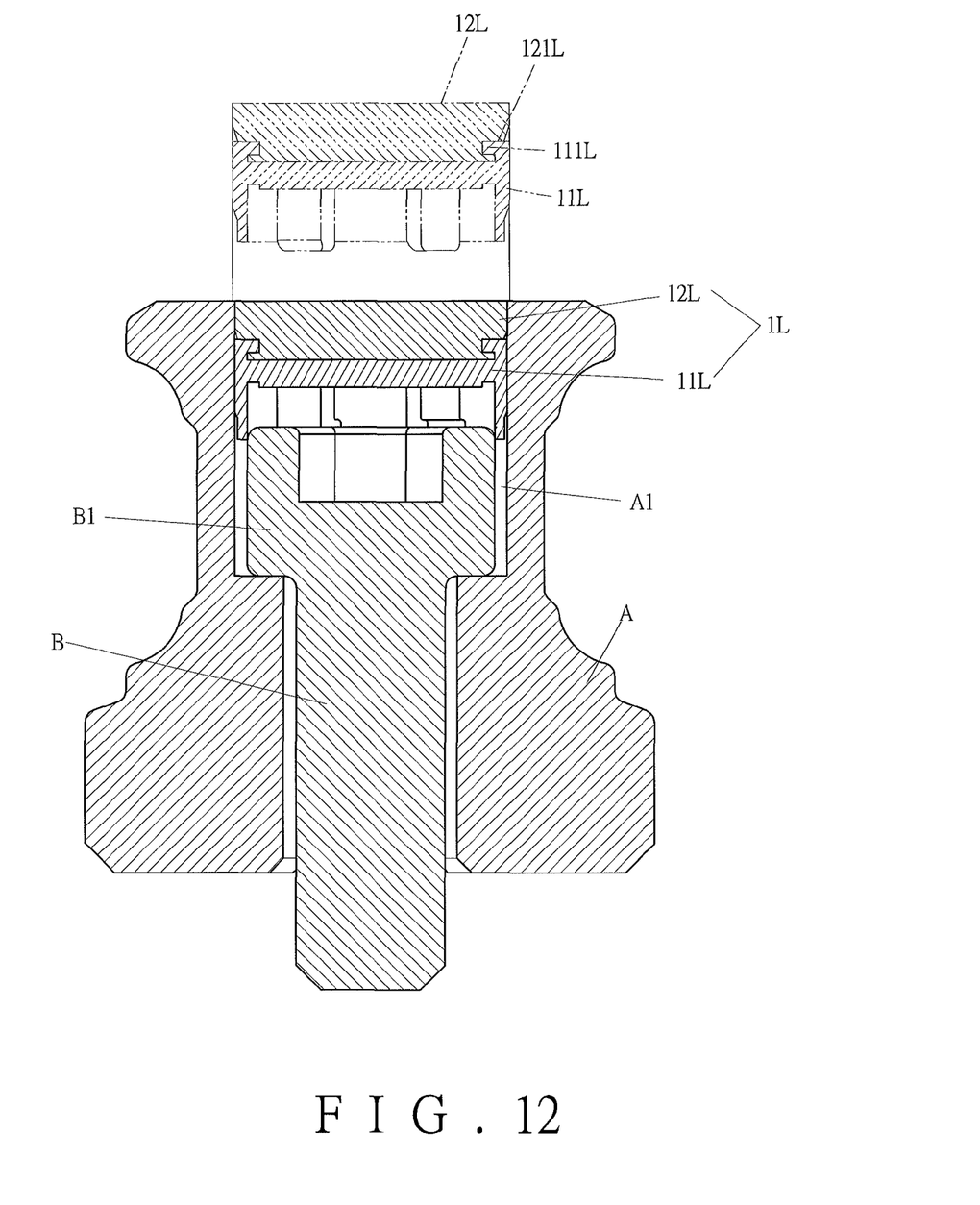
FIG. 12 shows the fourth embodiment of the bolt-hole cap of the present invention, wherein the bolt-hole cap has a contact portion and a metal cover, and shows the connection of the contact portion and the metal cover, and also shows the differences between the fourth embodiment of the bolt-hole cap that is not yet inserted into the bolt hole and the fourth embodiment of the bolt-hole cap that is inserted into the bolt hole.

FIG. 12 shows the fourth embodiment and comprises the bolt-hole cap 1L which has a contact portion 11L and a metal cover 12L. The metal cover 12L has a first connecting part 121L. The contact portion 11L is connected to the metal cover 12L by way of injection molding so as to form a second connecting part 111L which is connected with the first connecting part 121L. Consequently, the contact portion 11L and the metal cover 12L are combined together. Preferably, the first connecting part 121L is a metal groove, and the second connecting part 111L is an insertion configured to be inserted into the metal groove 121L.

While we have shown and described the embodiment in accordance with the present invention, it should be clear to those skilled in the art that further embodiments may be made without departing from the scope of the present invention.

What is claimed is:

1. A bolt-hole cap comprising:
a top face and a bottom face, multiple protrusions extending from the bottom face and each protrusion extending from an inner portion toward an outer portion of the bolt-hole cap, each protrusion having two side faces and an end face which is connected between the two side faces, the end face having a first width, when the bolt-hole cap is inserted into a bolt hole and the top face of the bolt-hole cap is in flush with a top face of a rail, the end face of each of the protrusions contacts a bolt in the bolt hole, the protrusions are plastically deformed toward the side faces, and the end face is deformed to have a second width which is wider than the first width.

2. The bolt-hole cap as claimed in claim 1, wherein a rounded edge is defined between the end face and one of the side faces of each protrusion, so that when the top face of the bolt-hole cap is in flush with the top face of the rail, each protrusion has a lateral plastic deformation smoothly generated toward the other one of the side faces, and the lateral plastic deformation is contacted with the bolt.

3. The bolt-hole cap as claimed in claim 1, wherein the bolt-hole cap has an annular outer wall extending from a periphery thereof, the outer wall extends in a direction the same as that of the protrusions, an outer diameter of the outer wall is larger than an inner diameter of the bolt hole, the outer wall is engaged with an inner periphery of the bolt hole when the bolt-hole cap is inserted into the bolt hole.

4. The bolt-hole cap as claimed in claim 3, wherein an annular recess is defined in the bottom face of the bolt-hole cap and located adjacent to the outer wall.

5. The bolt-hole cap as claimed in claim 3, wherein the bolt-hole cap has an annular inner wall extending from the bottom face thereof, the inner wall extends in a direction the same as that of the protrusions.

6. The bolt-hole cap as claimed in claim 5, wherein the protrusions are connected between the inner and outer walls.

7. The bolt-hole cap as claimed in claim 1, wherein the bolt hole has a shoulder face formed therein, and a first height is defined between the shoulder face and the top surface of the rail, the bolt has a bolt head, the bolt is threaded into the bolt hole, the bolt head is rested on the shoulder face, the bolt head has a second height, the first height is larger than the second height, a third height is defined between the top face of the bolt-hole cap and the end face of the protrusion, the third height is larger than a difference between the first and second heights.

8. The bolt-hole cap as claimed in claim 1, wherein each protrusion extends radially from the inner portion toward the outer portion of the bolt-hole cap.

9. The bolt-hole cap as claimed in claim 1, wherein the bolt-hole cap has a contact portion and a metal cover connected to the contact portion, the bottom face is located on the contact portion and the top face is located on the metal cover, the top face is in flush with the top surface of the rail.

10. The bolt-hole cap as claimed in claim 9, wherein metal cover has a first connection portion, and the contact portion is connected to the metal cover by way of injection molding so as to form a second connection portion connected to the first connection portion.

* * * * *